US006004656A

United States Patent [19]

Gosselin et al.

[11] Patent Number: 6,004,656

[45] Date of Patent: Dec. 21, 1999

[54] COLOR CHANGEABLE DEVICE

[75] Inventors: Raymond R. Gosselin, Stillwater; Thomas M. Spielbauer, Oakdale, both of Minn.

[73] Assignee: 3M Innovative Properties Company, St. Paul, Minn.

[21] Appl. No.: 08/970,329

[22] Filed: Nov. 14, 1997

[51] Int. Cl.[6] .............................. B32B 27/00; B31F 1/00

[52] U.S. Cl. .......................... 428/198; 428/199; 428/209; 428/343; 428/352; 428/354; 428/472; 428/915; 428/916; 101/32

[58] Field of Search ............................... 283/98, 99, 100, 283/101, 102, 103, 104, 106, 107, 108, 109, 110, 111, 112, 113, 114, 81; 428/915, 916, 43, 40.1, 41.7, 41.8, 41.9, 214, 42.1, 195, 201, 41.1, 209, 35.7, 213, 580, 198, 199, 472.1, 472, 343, 352, 354; 101/32

[56] References Cited

U.S. PATENT DOCUMENTS

| | | | |
|---|---|---|---|
| 4,469,725 | 9/1984 | Fischer et al. | 428/13 |
| 4,837,061 | 6/1989 | Smits et al. | 428/40 |
| 4,994,314 | 2/1991 | Rosenfeld et al. | 428/36.92 |
| 5,015,318 | 5/1991 | Smits et al. | 156/233 |
| 5,062,928 | 11/1991 | Smith | 204/15 |
| 5,135,262 | 8/1992 | Smith et al. | 283/94 |
| 5,149,386 | 9/1992 | Smits et al. | 156/150 |
| 5,250,173 | 10/1993 | Jozefowicz | 205/121 |
| 5,282,650 | 2/1994 | Smith et al. | 283/81 |
| 5,370,763 | 12/1994 | Curiel | 156/277 |
| 5,510,171 | 4/1996 | Faykish | 428/195 |

FOREIGN PATENT DOCUMENTS

| | | |
|---|---|---|
| 42 07 754 A1 | 9/1993 | Germany . |
| WO 92/22434 | 12/1992 | WIPO . |

OTHER PUBLICATIONS

International Search Report from International Application No. PCT/US98/04951.

*Primary Examiner*—William Krynski
*Assistant Examiner*—Chris Cronin
*Attorney, Agent, or Firm*—James J. Trussell

[57] ABSTRACT

A color changeable device that has been partially activated. The device comprises a flexible substrate with a first major surface and a second major surface and an interference color generating laminate on the first major surface. The color generating laminate comprises a first layer and a second layer in intimate contact. When the first and second layers are in intimate contact, the laminate generates an interference color. When the first and second layers are not in intimate contact, the laminate does not generate the interference color. The substrate and laminate include a first permanent deformation causing separation of the first and second layers at a first portion of the device while retaining the first and second layers in intimate contact at a second portion of the device. The device is particularly useful for confirming the authenticity of an article without having to remove the color change device from the article.

65 Claims, 6 Drawing Sheets

COLOR CHANGEABLE DEVICE

TECHNICAL FIELD

The present invention relates generally to color changeable devices. More specifically, the invention relates to color changeable devices which may be used as authenticatable devices, which may be authenticated visually without disturbing the device.

BACKGROUND OF THE INVENTION

Interference color generating devices are well known in the art. For example, U.S. Pat. No. 4,837,061 issued on Aug. 10, 1987 to Paul Smits et al. discloses a layered tamper evident structure which exhibits an irreversible color change when the layers are separated, thus providing evidence that the structure has been tampered. FIG. 1 is an illustration of such an interference color generating device.

The device 20 of FIG. 1 consists of a layer 10, preferably of a valve or refractory metal, a thin film 12 of a light transmitting material in direct and intimate contact with the layer 10, and an overlying strip 14 of flexible, tensionable translucent or transparent material, e.g. polyethylene. Valve metals, including tantalum (Ta), niobium (Nb), zirconium (Zr), hafnium (Hf), and titanium (Ti) and refractory metals including tungsten (W), vanadium (V), and molybdenum (Mo), are capable of generating intense colors when covered by a thin film of light transmitting materials. Layer 10 and thin film 12 are capable of generating a color by a light interference and absorption phenomenon that requires direct and intimate contact between layer 10 and thin film 12.

The preferred method of forming the thin film of light transmitting material 12 is anodization carried out in the presence of an adhesion-reducing agent, preferably a fluorine-containing compound. The anodization process forms a thin film 12 made of an oxide of the metal used to form metal layer 10. Ta and Nb are particularly preferred metals because of the wide range of colors accessible with this technique. The metal layer 10 and oxide layer 12 are in such intimate contact that the two layers conform closely with each other at the microscopic level at the interface or structurally merge together at the interface of the two layers 10, 12. Additionally, metal layer 10 and oxide layer 12 are in such direct contact that essentially no other material is between the two layers 10, 12 at the interface and excludes the presence of gas molecules from the air that tend to adhere to the layers once they are separated. The adhesion of the overlying strip 14 to the thin film 12 should be greater than the adhesion between the film 12 to the layer 10.

Referring to prior art device 20 in FIG. 1, white light incident on the structure, indicated by ray A, is partially reflected by the upper surface of the thin film 12 (ray B) and is partially transmitted to be reflected (ray C) by the upper surface of the layer 10. The interference colors generated when rays B and C combine will be weak if the relative intensities of rays B and C differ significantly, but will be intense if the intensities of rays B and C are similar. When highly reflective metals are used for the layer 10, most of the light is reflected at the upper surface of the metal layer and so ray C is much more intense than ray B. Light absorption (indicated by arrow X) takes place at the interface between thin film 12 and the layer 10. This absorption reduces the intensity of ray C and makes the intensities of rays B and C more comparable so that an intense color is generated. The light absorption depends on direct and intimate contact between layer 10 and film 12.

Separation of layer 10 and thin film 12 eliminates the light absorption indicated by ray X. As a result, the intense color originally generated by rays B and C is lost, leaving the gray color of the material 10 generated by ray C. The color generating device 20 is therefore also referred to as a color change device or a color changeable device. The intense color originally formed by rays B and C cannot be regenerated by repositioning film 12 on layer 10, even if the layers are pressed together, because the contact will no longer be direct (gas molecules intervene) and/or intimate (the surfaces will no longer conform closely at the microscopic level). As a result, the substantially irreversible color change acts as evidence that the layers have been separated and consequently that the structure has been disturbed or tampered.

U.S. Pat. No. 4,837,061 discloses separating layers 10, 12 in the device 20 shown in FIG. 1 by peeling the transparent or translucent material 14 and by puncturing by means of a needle or knife. This separation causes an irreversible color change.

U.S. Pat. No. 5,135,262, issued on Aug. 4, 1992, to Gary J. Smith et al. discloses an alternative means of separating layer 10, 12 by bending the laminate to small radii of curvature. FIG. 2 illustrates an interference color generating device as disclosed in U.S. Pat. No. 5,135,262. As the device 20 separates from article 22, its overall thickness and stiffness usually prevents it from forming a completely sharp angle, but instead it is bent around a short radius of curvature "r" at the apex of included angle "$\alpha$." The concentration of adhesion-reducing agent used in forming the anodized film 12 on metal layer 10 is sufficient to permit color change activation when r and $\alpha$ are in the range inevitably encountered when peeling the entire device 20 from article 22. To allow separation of thin film 12 from metal layer 10 on bending, U.S. Pat. No. 5,135,262 teaches using concentrations of fluoride in the range of 40–350 ppm during anodization. When the fluoride concentration falls outside this range, the desired separation color change may not occur on bending. In the case of higher concentrations, thin film 12 may fall off prematurely leading to unwanted color change.

U.S. Pat. No. 5,062,928 issued on Nov. 5, 1991 to Gary J. Smith discloses a process for producing color-change devices incorporating latent indicia, which are initially invisible messages, pattern or designs. Upon separation of layer 10 and thin film 12 the latent message or pattern is made visible to indicate tampering.

The process disclosed in U.S. Pat. No. 5,062,928 for producing color changeable devices incorporating latent indicia includes the following steps: a) preparing a substrate having a very thin sputtered layer of metal; b) applying masking material to certain areas of the metal layer, the masking material comprised of printing inks or conventional uncured resist materials; c) submitting the substrate to a single step anodization process with an electrolyte containing adhesion-reducing agent to produce a color-generating laminate incorporating an anodic film having detachable and non-detachable areas; and d) removing the masking material by washing.

FIG. 3 shows color change device 20 made by the process disclosed in U.S. Pat. No. 5,062,928. The areas of the device which were covered with the masking material are visually indistinguishable from the uncovered areas when layer 10 and thin film 12 are in intimate contact. Despite this, the difference between the masked areas 12*b* and uncovered areas 12*a* is that the adhesive-reducing agent in the electrolyte has weakened the adhesion between layer 10 and thin film 12 in the uncovered areas, but not in the masked areas 12*b*. As a result, the masked areas 12*b* are preferential areas with a high bond strength of intimate contact so that layer 10 and thin film 12 will not separate. When peeling or bending takes place, the anodic or oxide thin film 12 is detached from the underlying metal layer 10 in the uncovered areas 12*a*, but remains attached to the underlying metal layer 10 in the masked areas 12*b* because of the tenacious adhesion of the anoidic thin film 12 to the metal layer 10 in these areas. Masked areas 12*b* continue to generate the original intense color, while uncovered areas 12*a* undergo the color change. As a result, the latent indicia becomes visible to indicate tampering.

Similar labels are commercially available from Minnesota Mining and Manufacturing Company, in St. Paul, Minn. as 3M™ Optical Thin Film Authenticating Devices. FIG. 4 is an illustration of such a label. Label 20 includes a release liner 24, a layer of adhesive 26, a flexible substrate 16, layer 10, thin film 12 and translucent layer 14.

Although the performance of available interference color generating devices has been impressive, it is desirable to further improve the device by allowing authentication without removing the device from the article .

SUMMARY OF THE INVENTION

One aspect of the present invention provides a color changeable device. The device comprises a flexible substrate with a first major surface and a second major surface and an interference color generating laminate on the first major surface. The color generating laminate comprises a first layer and a second layer in intimate contact. When the first and second layers are in intimate contact, the laminate generates an interference color. When the first and second layers are not in intimate contact, the laminate does not generate the interference color. The substrate and laminate include a first permanent deformation causing separation of the first and second layers at a first portion of the device while retaining the first and second layers in intimate contact at a second portion of the device. The substrate is continuous.

Another aspect of the present invention provides a color changeable device as described above. In this embodiment, the structural integrity of the substrate is maintained at the permanent deformation.

Another aspect of the present invention provides a color changeable device as described above. In this embodiment, there is a layer of adhesive on the second major surface of the flexible substrate and a release liner provided on an exposed surface of the layer of adhesive. This embodiment further includes a translucent layer provided on an exposed surface of the color generating laminate. The substrate, the laminate, the layer of adhesive, the release liner, and the translucent layer include a first permanent deformation causing separation of the first and second layers at a first portion of the device while retaining the first and second layers in intimate contact at a second portion of the device.

Another aspect of the present invention provides a color changeable device as described above. In this embodiment, the first and second layers include a preferential area with a sufficiently high bond strength so as to remain in intimate contact. The areas of high bond strength are in the form of indicia. The first portion of the device includes the preferential areas of high bond strength.

Another aspect of the present invention provides a color changeable device as described above. In this embodiment, the device is bossed so as to cause separation of the first and second layers at a first portion of the device while retaining the first and second layers in intimate contact at a second portion of the device.

Another aspect of the present invention provides a color changeable device as described above. In this embodiment, the substrate and laminate include a first deformation and a second deformation remote from the deformation. The first deformation and second deformation cause separation of the first and second layers of the laminate at a first portion of the device extending from the first deformation to the second deformation while retaining the first and second layers in intimate contact at a second portion of the device.

Another aspect of the present invention is a method of activating a local portion of a color changeable device comprising the steps of: a) placing a color changeable device, including any of the devices described above, between a die and counter die having corresponding recessed and raised portions; and b) compressing the die and counter die with sufficient pressure so as to permanently deform the device to cause separation of the first and second layers at a first portion of the device while retaining the first and second layers in intimate contact at a second portion of the device. In one embodiment, the method includes orienting the device such that the first major surface faces the die and the second major surface faces the counter die. In another embodiment, the method includes orienting the device such that the second major surface faces the die and the first major surface faces the counter die.

Certain terms are used in the description and the claims that, while for the most part are well known, may require some explanation. The term "bossing" is used to mean both "embossing" and "debossing." Embossing is a process is which the die in the top position of press set up includes female portions and in which the counter die in the bottom position includes corresponding male portions. Debossing is a process in which the die in the top position of the press set up includes male portions and in which the counter die includes corresponding female portions. A "boss" is the protuberance resulting from either embossing or debossing. The term "activated" when used herein to describe a color changeable device indicates that a color change was obtained by separating the layers of the color generating laminate.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
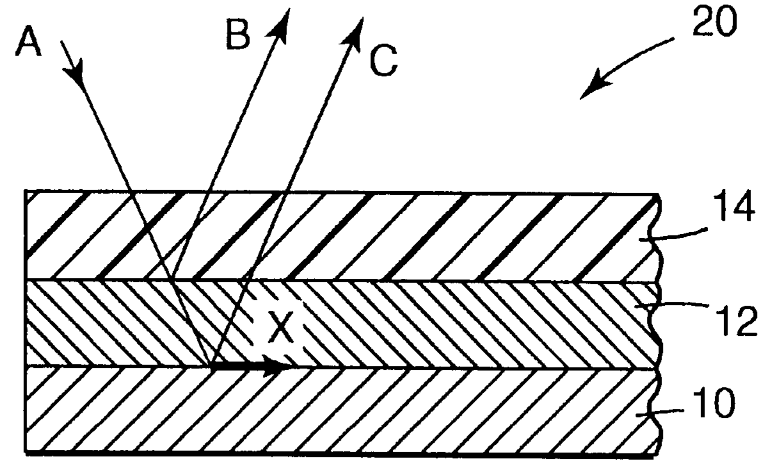
Fig. 1 Prior Art
FIG. 1 is a cross-sectional view of a prior art interference color generating device.
Figure 2:
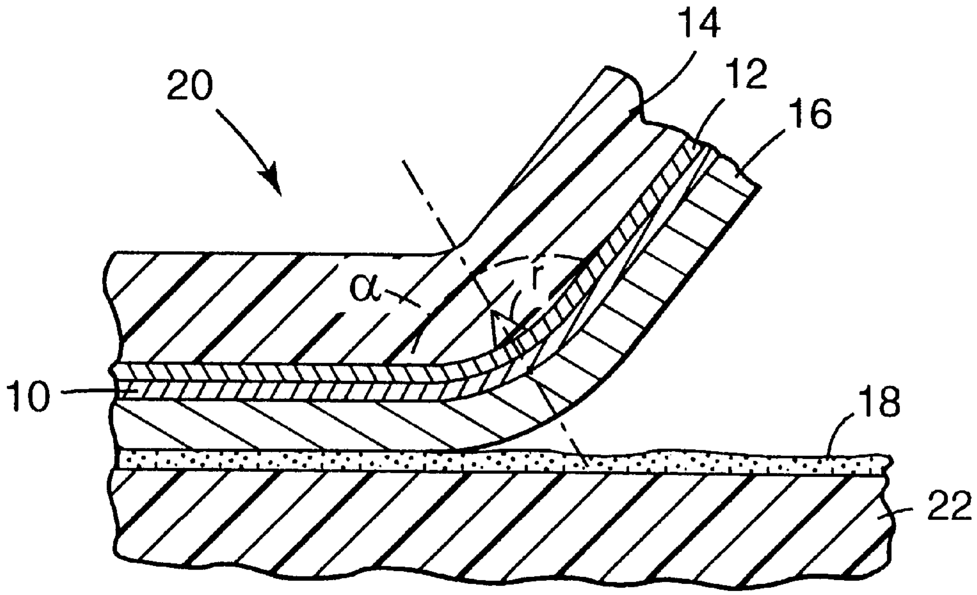
Fig. 2 Prior Art
FIG. 2 is a cross-sectional view of another prior art interference color generating device.
Figure 3:
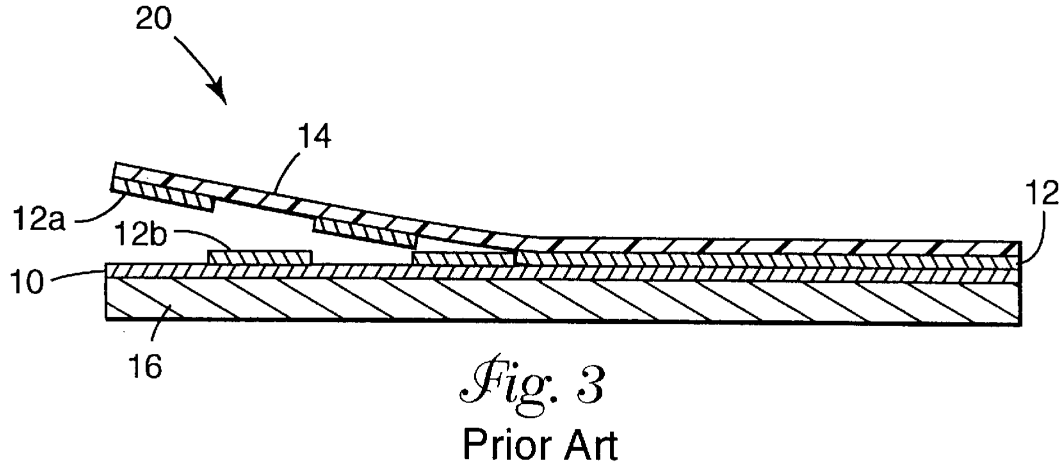
Fig. 3 Prior Art
FIG. 3 is a cross-sectional view of a prior art interference color generating device incorporating latent indicia.
Figure 4:
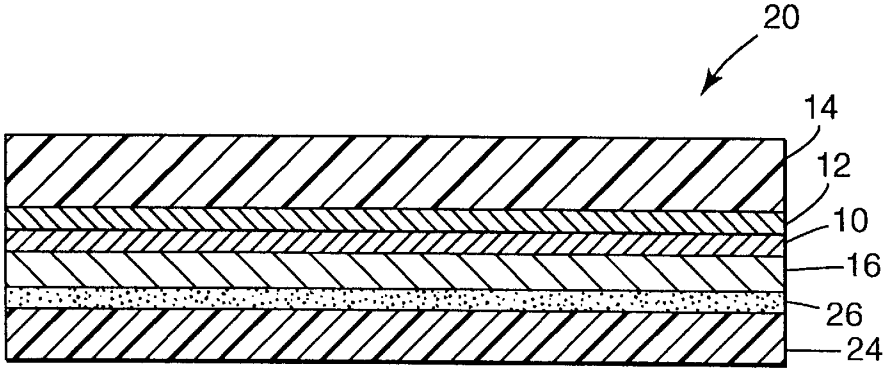
Fig. 4 Prior Art
FIG. 4 is a cross-sectional view of a prior art interference color generating device in the form of an adhesive label.
Figure 5:
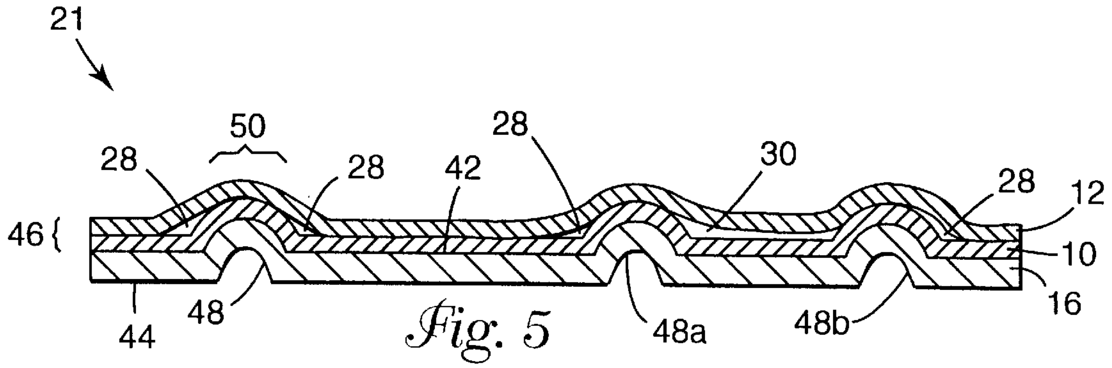
FIG. 5 is a cross-sectional view of one preferred embodiment of a color changeable device according to the present invention.

FIG. 5 illustrates one preferred embodiment of a color changeable device 21 according to the present invention. Device 21 includes a flexible substrate 16 with a first major surface 42 and a second major surface 44. On the first major surface 42 is an interference color generating laminate 46. Laminate 46 consists of a layer 10, preferably of a valve or refractory metal, and a thin film 12 of a light transmitting material in direct and intimate contact with the layer 10. In the areas where layer 10 and thin film 12 are in intimate contact, laminate 46 generates an interference color by the light interference and absorption phenomenon described above with reference to FIG. 1. In the areas 28, 30 where layer 10 and thin film 12 are not in intimate contact, the laminate 46 does not generate the interference color.

The substrate 16 and laminate 46 include at least one permanent deformation 48. The permanent deformation 48 is preferably a boss. A "boss" as used herein is the protuberance left by the act of embossing or debossing the device 21. Permanent deformation 48 may project from the first major surface 42 as illustrated, or project from the second major surface 44 of the substrate 16. In FIG. 5, layer 10 and thin film 12 are not in intimate contact in the general area of permanent deformation 48. These separated portions 28, 30 are caused by forming the permanent deformation 48, which causes sufficient stress to separate the direct and intimate contact at the interface between layer 10 and thin film 12. Directly above the boss, layer 10 and thin film 12 may remain in intimate contact, as shown by area 50. Alternatively, separated portions 28 may extend entirely over the permanent deformation 48. When device 21 includes a second permanent deformation **48*a* remote from a first permanent deformation 48*b*, the separated portion 30 optionally can extend between adjacent permanent deformations 48*a* and 48*b*. In the separated portions 28, 30 where the metal layer 10 and thin film 12 have been separated, the device no longer generates an intense color by the light reflection and absorption phenomenon. In the remainder of the device, layers 10 and thin film 12** remain in intimate contact and continue to generate a color.

Substrate 16 is preferably flexible and capable of having layer 10 sputter coated on. In a preferred embodiment, substrate 16 is a laminate of aluminum and polyester. The metal layer 10 is applied to the aluminum layer of laminate 16. A preferred substrate 16 is Lamiglas LG973, a 51 μm layer of polyethylene terephthalate and a 9 μm layer of aluminum adhered together, which was used for Preparatory Example 1. Another preferred substrate 16 is Lamiglas LG1055, a 23 μm layer of polyethylene terephthalate and a 9 μm layer of aluminum adhered together, which was used for Preparatory Example 2. Both substrates are available from Facile Technologies, located in Peterson, N.J.

Layer 10 preferably comprises a valve or refractory metal. Valve or refractory metals are capable of generating intense colors when covered by a thin film of light-transmitting materials. Valve metals include tantalum (Ta), niobium (Nb), zirconium (Zr), hafnium (Hf), and titanium (Ti). Refractory metals include tungsten (W), vanadium (V), and molybdenum (Mo). U.S. Pat. No. 4,837,061 also teaches layer 10 could alternatively comprise gray transition metals such as nickel (Ni), iron (Fe) and chromium (Cr), semi-metals such as bismuth (Bi), or semiconductors such as silicon (Si). In the preferred embodiment, layer 10 is made of tantalum or niobium. Layer 10 can be sputter coated onto flexible substrate 16 by a commercially available magnetron sputtering apparatus. (see, e.g. U.S. Pat. No. 4,837,061, the disclosure of which is incorporated herein by reference in its entirety.)

Thin film 12 preferably comprises a light transmitting material. A preferred method of forming thin film 12 is anodization, which forms a thin film made of an oxide of the metal used to form the metal layer 10. (see, e.g. U.S. Pat. No. 5,135,262 and U.S. Pat. No. 5,282,650, the disclosures of which are incorporated herein by reference in their entirety.) The anodization preferably is carried out in the presence of an adhesion reducing agent, preferably a source of fluoride ion, preferably a simple salt, e.g. NaF or KF. The preferred total fluorine concentration falls within the range of 40–350 ppm when using citric acid as the electrolyte. To produce color generating laminates from tantalum or niobium which are activated upon bending, the anodization process preferably includes using concentrations of total fluorine within the range of 40–350 ppm are used and voltages within the range of 85–150 V. The table below includes anodization voltages, color that is generated, anodization time and fluorine concentrations used when the metal layer 10 comprises tantalum.

TABLE A

| Anodization Voltage | Color | Anodization Time (s) | Fluorine Concentration Maximum (ppm) | Fluorine Concentration Minimum (ppm) |
|---|---|---|---|---|
| 85 V | Yellow | 10 | 90 | 80 |
| | (or Gold) | 20 | 90 | 70 |
| | | 30 | 80 | 70 |
| 110 V | Red | 10 | 80 | 50 |
| | (or Wine) | 20 | 70 | 50 |
| | | 30 | 70 | 50 |
| 120 V | Blue | 10 | 80 | 50 |
| | (or Purple) | 20 | 70 | 40 |
| | | 30 | 70 | 40 |
| 140 V | Green | 10 | 60 | 40 |
| | | 20 | 60 | 40 |
| | | 30 | 70 | 40 |

When layer 10 is tantalum, the preferred total fluorine concentration is in the range of 40–90 ppm in the anodizing electrolyte. When layer 10 is niobium, a total fluorine concentration in the range of 150–350 ppm is preferred.

The color generated by each valve or refractory metal depends on the thickness of the overlying thin film 12. The thickness of thin film 12 is controlled by the anodization process, including the anodization voltage. The following table correlates the colors generated with the thickness of thin film 12 of tantalum oxide. The thickness of the metal layer 10 is not critical except that it should be thick enough that after anodization the thickness of metal layer 10 is at least about 250 Å.

TABLE B

| $Ta_2O_5$ Thickness Å | Generated Color |
|---|---|
| 334 | brown |
| 418 | purple |
| 501 | dark blue |
| 668 | light blue |
| 1303 | yellow |
| 1420 | rust |
| 1553 | dark red |
| 1670 | violet |
| 1754 | aqua blue |
| 1870 | blue-green |
| 2004 | green |

Figure 6:
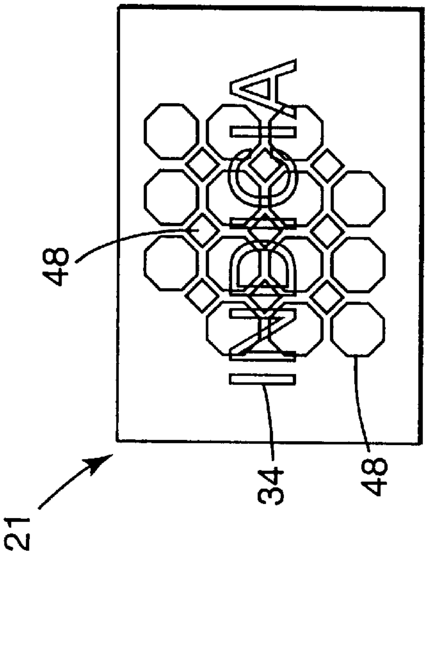
FIG. 6 is a plan view of an alternative embodiment of the present invention incorporating latent indicia.

FIG. 6 is a plan view a second preferred embodiment of a color changeable device of the present invention which includes latent indicia 34. Color changeable devices incorporating latent indicia can be made by the process disclosed in U.S. Pat. No. 5,062,928. The method includes the following steps: a) preparing a substrate 16 having a very thin sputtered layer of metal 10; b) applying masking material to certain areas of the metal layer, the masking material comprised of printing inks or conventional uncured resist materials; c) submitting the metal layer 10 to a single step anodization process with an electrolyte containing adhesion-reducing agent to produce a color-generating laminate incorporating an anodic film having uncovered areas and masked areas; and d) removing the masking material by washing. (see, e.g. U.S. Pat. No. 5,062,928, the disclosure of which is incorporated herein by reference in its entirety.)

The difference between the masked areas and uncovered areas is that the adhesive-reducing agent in the electrolyte has weakened the adhesion between layer 10 and thin film 12 in the uncovered areas, but not in the masked areas. As a result, the masked areas are preferential areas with a high bond strength of intimate contact so that layer 10 and thin film 12 will not separate. When peeling or bending of laminate 46 occurs, thin film 12 will no longer be in intimate contact with the underlying metal layer 10 in the uncovered areas and will undergo the color change. In addition, when peeling or bending of laminate 46 occurs, the masked areas remain in intimate contact with the underlying metal layer 10 because of the tenacious adhesion of the anodic thin film 12 to the metal layer 10 in these areas and will continue to generate the interference color. As a result, at least a portion of the latent indicia 34 becomes visible upon activation.

In FIG. 6, device 21 includes preferential areas with a high bond strength of intimate contact in the form of an indicia 34. The indicia 34 may be in the form of a positive indicia when the areas of high bond strength, which remain in intimate contact, form the indicia. Alternatively, indicia 34 may be in the form of a negative indicia when the separated portions form the indicia. The stress produced by forming the permanent deformation 48 causes layer 10 and thin film 12 to separate near the deformation thereby allowing at least a portion of the indicia 34 to be visible in the separated portion 28. (See FIG. 5.) In addition, the stress may be sufficient in the areas 30 between adjacent permanent deformations 48*a* and 48*b* (indicated in FIG. 5) to cause separation of layer 10 and thin film 12 between the adjacent permanent deformations 48*a* and 48*b* thereby allowing a portion of the indicia 34 to be visible.

The indicia 34 may include alphanumeric characters, designs (e.g., television or movie characters), and the like. Further, the indicia 34 may include and/or be in the form of copyrightable material and/or a trademark, including a registered trademark and/or registered copyright as defined under the laws of any country, territory, etc. of the world (including those of the United States).

In the preferred embodiment, substrate 16 is continuous. In this way, the structural integrity of substrate 16 is maintained and substrate 16 does not contain any holes or interruptions. In other words, the permanent deformation 48 does not break substrate 16 open. In embodiments which include translucent layer 14, the translucent layer 14 preferably remains continuous and uninterrupted, and has not been broken by the permanent deformation 48. One advantage of keeping device 21 continuous is to eliminate the sharp edges that can be caused by piercing the device. It also reduces the chances of contaminates entering the color generating laminate 46. It also prevents adhesive 26 from oozing through device 21 and minimizes exposure of adhesive 26 to tampering. Maintaining a continuous device 21 makes the indicia 34 easier to read, and maintains the strength of device 21 when used as a label.

For clarity, FIG. 5 illustrates only the substrate 16 and color generating laminate 46. As discussed below, with reference to FIG. 7, device 21 preferably includes a translucent layer 14 to protect the color generating layer 46. When the device 21 is to be mounted on an article, it preferably includes a layer of adhesive 26, optionally covered by a release liner 24.

Figure 7:
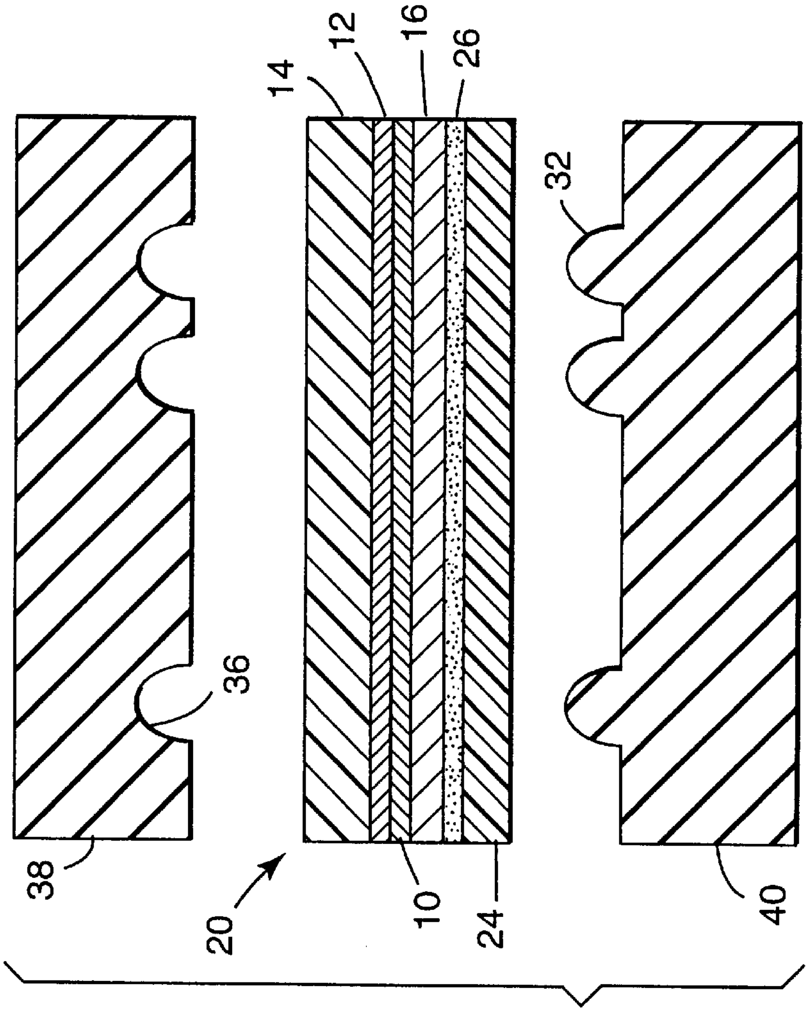
FIG. 7 is a cross-sectional view of an apparatus useful with the method of the present invention shown prior to embossing.

FIG. 7 is a cross-sectional view of the preferred apparatus and the method of forming the permanent deformation by embossing. The die 38 and counter die 40 are used for imparting a permanent deformation of a desired shape onto a color changeable device. Die 38 is typically metal, preferably engraved or etched copper. Counter die 40 is preferably cast in resin from the engraved or etched die 38 so that die 38 and counter die 40 have corresponding male and female portions. The manufacture and use of embossing and debossing dies is well known and need not be described in great detail.

In FIG. 7, die 38 has recessed cavities 36 and counter die 40 has corresponding raised portions 32. A preferred apparatus includes a copper die 38 including male portions above the device 21 and a cast counter die 40 including corresponding female portions below the device, with the translucent layer 14 facing the die and release liner 24 facing the counter die. Either the die or counter die may be in the top or bottom position, and the device 21 may be embossed with translucent layer 14 facing either the die or counter die.

Figure 8:
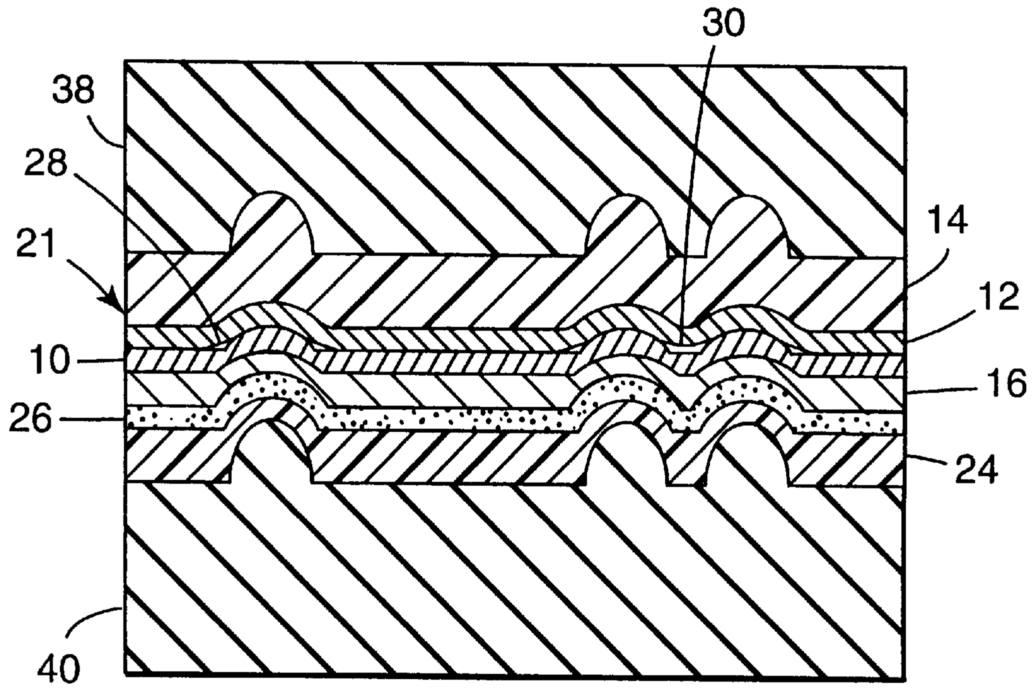
FIG. 8 is a cross-sectional view of the apparatus of FIG. 7 embossing the color changeable device.

FIG. 8 is a cross-sectional view of the apparatus of FIG. 7 embossing the color changeable device, thereby forming one embodiment of the present invention. Device 21 includes a flexible substrate 16 and a color generating laminate on the first major surface of the substrate 16. Interference color generating laminate is comprised of metal layer 10 and thin film 12 preferably formed by the processes described above. Device 21 further includes a translucent layer 14 provided on the exposed surface of interference color generating laminate. Preferably, translucent layer 14 comprises a polymeric film. More preferably translucent layer 14 comprises polyester film. Alternatively, translucent layer 14 may comprise a commercially available varnish or overprint varnish. Device 21 may further include a layer of adhesive 26 located on the second major surface 44 and a release liner 24 on exposed layer of adhesive 26. The adhesive 26 is selected to provide a sufficiently strong bond to the article to which it is to be affixed. In this way, layer 10 and thin film 12 will be separated when the device 21 is removed from the article.

Preferably, device 21 includes substrate 16, color generating laminate and translucent layer 14 prior to bossing. Optionally, device 21 also includes liner 24 and layer of adhesive 26 prior to bossing. Optionally, liner 24 and layer of adhesive 26 may be added to device 21 after bossing. Optionally, translucent layer 14 may be added to device 21 after bossing.

Figure 9:
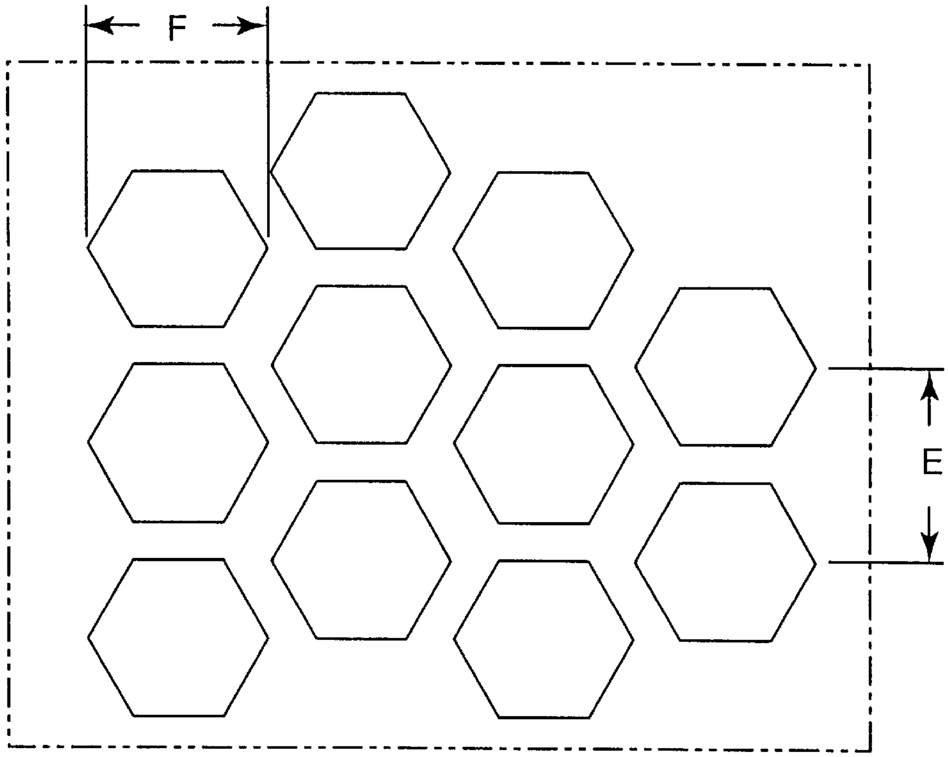
FIG. 9 is one preferred embodiment of the die or counter die of FIGS. 7 and 8.

FIG. 9 is one preferred embodiment of die 40 or counter die 38 of FIGS. 7 and 8. The boss configuration includes raised areas and corresponding cavities in the shape of hexagons. Distance E denotes the distance between corresponding vertexes of adjacent hexagons. Distance F is the distance between opposite vertexes of a hexagon. Dies including other polygons may be used.

Figure 10:
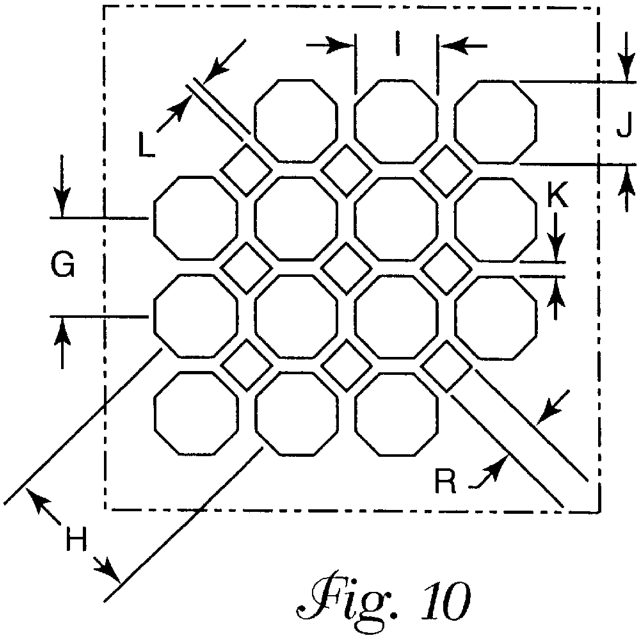
FIG. 10 is an alternative embodiment of the die or counter die of FIGS. 7 and 8.

FIG. 10 is an alternative embodiment of the die or counter die of FIGS. 7 and 8. The boss configuration includes raised areas and corresponding cavities in the shapes of octagons and squares. Specific sizes and spacings are indicated on FIG. 10 as G, H, I, J, K, L and R.

Figure 11:
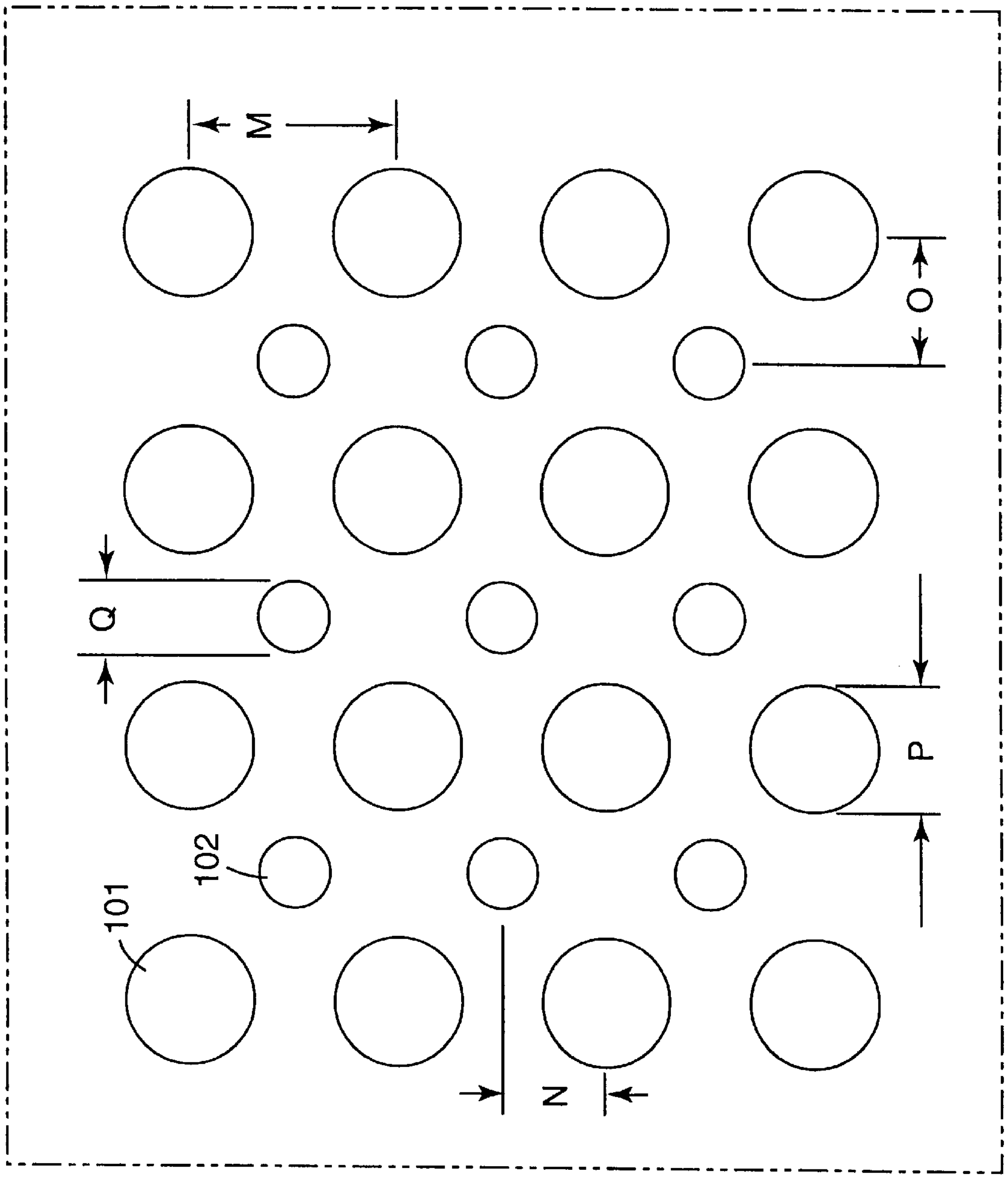
FIG. 11 is an alternative embodiment of the die or counter die of FIGS. 7 and 8.

FIG. 11 is another alternative embodiment of the die or counter die of FIGS. 7 and 8. The boss configuration includes raised areas and corresponding cavities in the shape of circles. Two different sized circles 101, 102 can be used. Specific distances are noted on FIG. 11 as distance M, N, O, P, and Q.

Figure 12:
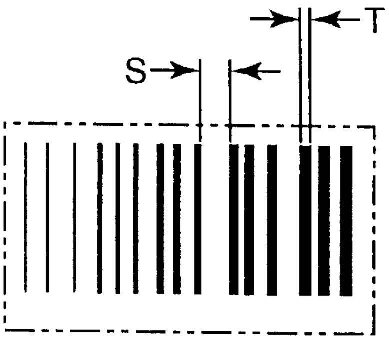
FIG. 12 is an alternative embodiment of the die or counter die of FIGS. 7 and 8.

FIG. 12 is an alternative embodiment of the die or counter die of FIGS. 7 and 8. The boss configuration includes raised areas and corresponding cavities in the shape of lines of various widths, noted by distance T, and having various space between the lines, noted by distance S. Preferred sizes and spacings for the raised areas and cavities in the dies and counter dies described above are set forth in the examples below.

While the preferred method of forming permanent deformations is embossing or debossing, any method that does not break substrate 16 may be used, such as scribing with a stylus or pen or using pressure to conform device 21 to any patterned surfaces.

Figure 13:
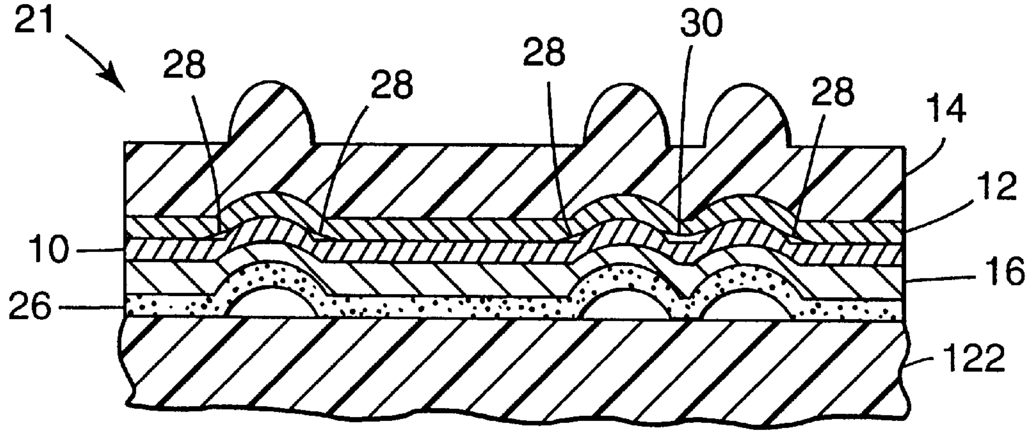
FIG. 13 is the color changeable device of FIG. 8 adhered to an article to be authenticated.

As shown in FIG. 13, color changeable devices can be made in the form of a label and adhered to an article 122 to be authenticated. The color change occurring at separated portions 28, 30 at permanent deformation 48 can been seen thereby confirming authenticity of the device without having to activate the entire label, as was necessary with prior art devices. Optional indicia 34 can be seen in separated areas 28, 30. A final user may remove device 21 from article 122 entirely causing further color change over the whole device, and optionally exposing more latent indicia 34.

The variables of the bossing process can be balanced to achieve the desired results based on the characteristics of device 21, such as the thickness and stiffness of the substrate 16, the strength of the bond between layer 10 and thin film 12, and whether the adhesive 26 and liner 24 are-present during bossing. The variables of the bossing process include: configuration of the die and counter die including size, shape and spacing between of the raised portions and the cavities; pressure used in bossing, the spacing between the die and counter die; and whether heat is used.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

Preparatory Examples 1–2

A composite comprising an interference color generating laminate 46 on the first major surface of a flexible substrate 16 was obtained from Alcan International Limited, Montreal, Canada. It is believed that the composite was prepared as described in this Preparatory Example. The flexible substrate 16 consisted of a layer (about 8.9 μm thick) of aluminum on a layer (about 50 μm thick) of polyethylene terephthalate ("PET") film. The aluminum surface of the aluminum/PET substrate was sputter coated with tantalum to an adequate thickness to allow the desired amount of anodization.

Indicia were printed on the tantalum using an uncured flexographic ink as described in Example 6 of U.S. Pat. No. 5,135,262. The indicia were in the form of letters printed in various sizes and font styles. Printed indicia included both positive images wherein the areas covered by ink form the indicia and negative images wherein the areas not covered by ink form the indicia.

The printed tantalum/aluminum/PET composite is believed to have been anodized by the process described in Example 2 of U.S. Pat. No. 5,135,262. The anodization was carried out in citric acid electrolyte containing fluoride ion. The anodizing voltage and fluoride ion concentration are selected to provide the desired final color, as explained above.

The composite of PREPARATORY EXAMPLE ("PREP. EX.") 2 was obtained from Alcan International Limited and is believed to have been prepared as described in PREP. EX. 1, except that the PET film substrate was about 25 μm thick.

Preparatory Examples 3–8

The composites of PREP. EX. 3 and PREP. EX. 4 were prepared using the composite of PREP. EX. 1. Composites of PREP. EX. 5 and PREP. EX. 6 were prepared using the composite of PREP. EX. 2. A translucent layer 14 comprising overlaminating film having a facestock and an adhesive was laminated to the anodized tantalum surface of the tantalum/aluminum/PET composite of PREP. EX. 1 and PREP. EX. 2 using a standard laminating procedure utilizing a roll to roll process and a laminating nip. The label stock from which the overlaminating film 14 was obtained consisted of a translucent layer of PET film, a 20 μm thick layer of acrylic adhesive and a silicone coated release liner. The overlaminating film with adhesive used for PREP. EX. 3 and PREP. EX. 5 has a PET film thickness of about 25 μm and is available as #7831 ScotchMark™ Label Stock from 3M, St. Paul, Minn. For PREP. EX. 4 and PREP. EX. 6, the overlaminating film was that described for PREP. EX. 3 and PREP. EX. 5, except that a PET film of about 12.5 μm thick was substituted for the 25 μm thick PET overlaminating film. The silicone coated release liner was removed and the adhesive and PET film were laminated to the anodized tantalum surface of the composite of PREP. EX. 1 and PREP. EX. 2.

The composites of PREP. EX. 7 and PREP. EX. 8 comprised an interference color generating laminate on the first major surface of a flexible substrate prepared as described in PREP. EX. 1 and PREP. EX. 2 respectively. The composites of PREP. EX. 1 and PREP. EX. 2 were provided with an overlaminating film on the anodized tantalum surface and an adhesive with a paper liner on the PET film substrate surface of the composite. The overlaminating film used for PREP. EX. 7 and PREP. EX. 8 was that described in PREP. EX. 3 and PREP. EX. 4 respectively. For both PREP. EX. 7 and PREP. EX. 8, the adhesive and paper liner applied to the PET film substrate surface of substrate 16 were a 25 μm thick layer of acrylic adhesive on an 80 μm thick 55# densified Kraft paper liner (available as #9457 Scotch™ Brand Laminating Adhesives For Label Component Systems from 3M, St. Paul, Minn.). The silicone coated release liner was removed from the overlaminating film. The resultant overlaminating film was laminated to the anodized tantalum surface and the adhesive and paper liner were laminated PET substrate surface respectively of the composite using a standard laminating procedure utilizing a roll to roll process and a laminating nip.

The constructions of PREP. EX. 1–8 are summarized out in TABLE I.

TABLE I

| PREP. EX. | PET Film Substrate (a component of 16) (μm) | | PET Overlaminating Film (a component of 14) (μm) | | Laminating Adhesive on Paper Liner |
|---|---|---|---|---|---|
| No. | 50 | 25 | 25 | 12.5 | (26 and 24) |
| 1 | x | | | | |
| 2 | | x | | | |
| 3 | x | | x | | |
| 4 | x | | | x | |
| 5 | | x | x | | |
| 6 | | x | | x | |
| 7 | x | | x | | x |
| 8 | | x | | x | x |

Examples 1–16

The composite of PREP. EX. 7 was embossed with a boss configuration in the shape of a circle (i.e., dots) using a die similar to that depicted in FIG. 1, except that all the dots were of the same size and the dot pattern was that of only the large dots 101. The height of the raised portion of the die depicted in FIG. 11 was 152 μm. Color changeable devices were produced by an embossing process using dies and counter dies having various dot diameters and center to center distances. TABLE II sets out the dot diameter ("Dot Diameter") corresponding to the "P" value in FIG. 11 and the distance from the center of one large dot to the center of the next large dot ("C/C Distance") corresponding to the "M" value in FIG. 11. Table II also includes the interference color of the composite.

For all examples, the embossing press setup was a 164/68 Hot Stamp Printer (a Series 164 Kensol/Franklin Hot Stamping Machine from KF Systems, Norwood, Mass.) with the bossing die on the top and the counter die on the bottom. The press set up did not include heat when bossing the samples. The "daylight opening", i.e., the space between the upper and lower platens, was adjusted to accommodate the thickness of the sample. Coarse adjustment of the length of travel of the stamping head was accomplished by turning a threaded ball stud in a casting connected to the crankshaft, one turn of the nut being equivalent to about 0.2 cm (0.084 inches). After initial samples were bossed and rated, additional samples, in some instances, were bossed with increased or decreased pressure. Fine pressure adjustment was accomplished on the lower platen (i.e., swivel bed of two opposing wedges) by turning an adjusting knob, one turn of the adjusting knob being equivalent to about 4.6 mm (0.0018 inches).

The composites of EXAMPLES 1–8 and 13–16 were independently embossed with the liner side 24 of the composite adjacent the counter die (i.e., liner side down; "LD") and the liner side 24 adjacent the die (i.e., liner side up; "LU"). Each resultant device was rated on a scale of 0 to 10 with 0 indicating "No Visible Image" and 10 indicating a "Clearly Visible Image". A rating of zero indicates there was no visible color change. A rating of five or six indicates the indicia started to become partially visible. A rating of seven or above is desirable for commercial products. The prefix "C" identifies a comparative example.

The pressure used in the press setup was increased by turning the fine adjustment knob approximately 1–2 turns clockwise. The embossing process was repeated at the increased pressure and the quality of the embossed color changeable device rated as shown in TABLE II.

TABLE II

| Ex. No. | Dot Diameter (μm) | C/C Distance (μm) | Interference Color | Initial Pressure LD | Initial Pressure LU | Increased Pressure LD | Increased Pressure LU |
|---|---|---|---|---|---|---|---|
| C-1 | 254 | 381 | Wine | 0 | 0 | 0 | 0 |
| C-2 | 254 | 508 | Wine | 0 | 0 | 0 | 0 |
| C-3 | 254 | 635 | Wine | 0 | 0 | 0 | 0 |
| C-4 | 254 | 762 | Wine | 0 | 0 | 0 | 0 |
| 5 | 635 | 762 | Wine | 0 | 5 | 3 | 6 |
| 6 | 635 | 889 | Wine | 0 | 6 | 2 | 7 |
| 7 | 635 | 1016 | Wine | 0 | 4 | 1 | 5 |
| 8 | 635 | 1143 | Wine | 0 | 2 | 0 | 2 |
| 9 | 635 | 762 | Blue | — | — | 1 | 1 |
| 10 | 635 | 889 | Blue | — | — | 1 | 5 |
| 11 | 635 | 1016 | Blue | — | — | 1 | 5 |
| C-12 | 635 | 1143 | Blue | — | — | 0 | 0 |
| 13 | 1016 | 1143 | Wine | 0 | 3 | 0 | 3 |
| 14 | 1016 | 1270 | Wine | 0 | 3 | 0 | 3 |
| 15 | 1016 | 1397 | Wine | 0 | 2 | 0 | 2 |
| 16 | 1016 | 1524 | Wine | 0 | 1 | 0 | 1 |

Examples 17–32

The composite of PREP. EX. 7 was debossed using the boss configuration in the shape of dots described in EXAMPLES 1–16. Color changeable devices were produced by a debossing process using dies and counter dies having various dot diameters and center to center distances. The debossing process used the press setup described in EXAMPLES 1–16.

Composites were independently debossed with the liner side 24 of the composite adjacent the counter die ("LD") and the liner side adjacent the die ("LU"). Each resultant device was rated as described in EXAMPLES 1–16 and the rating set out in TABLE III.

The pressure used in the press setup was increased for EXAMPLES 21–24 by turning the fine adjustment knob approximately 1–2 turns clockwise. The debossing repeated at the increased pressure and the quality of the debossed color changeable device rated as shown in TABLE III.

The pressure used in the press setup was decreased for EXAMPLES 17–24 by turning the fine adjustment knob approximately 1–2 turns counterclockwise from the initial pressure setting. The debossing process was repeated at the decreased pressure and the quality of the debossed color changeable device rated as shown in TABLE III.

TABLE III

| Ex. No. | Dot Diameter (μm) | C/C Distance (μm) | Color | Initial Pressure LD | Initial Pressure LU | Increased Pressure LD | Increased Pressure LU | Decreased Pressure LD | Decreased Pressure LU |
|---|---|---|---|---|---|---|---|---|---|
| C-17 | 254 | 381 | Wine | 0 | — | — | — | 0 | — |
| 18 | 254 | 508 | Wine | 7 | — | — | — | 1 | — |
| 19 | 254 | 635 | Wine | 8 | — | — | — | 5 | — |
| 20 | 254 | 762 | Wine | 7 | — | — | — | 5 | — |
| 21 | 635 | 762 | Wine | 0 | 0 | 2 | 3 | 2 | 3 |

TABLE III-continued

| Ex. | Dot Diameter | C/C Distance | | Initial Pressure | | Increased Pressure | | Decreased Pressure | |
|---|---|---|---|---|---|---|---|---|---|
| No. | (μm) | (μm) | Color | LD | LU | LD | LU | LD | LU |
| 22 | 635 | 889 | Wine | 1 | 0 | 7 | 4 | 7 | 4 |
| 23 | 635 | 1016 | Wine | 1 | 0 | 7 | 2 | 7 | 2 |
| 24 | 635 | 1143 | Wine | 0 | 0 | 7 | 3 | 7 | 3 |
| C-25 | 254 | 381 | Blue | 0 | 0 | — | — | — | — |
| 26 | 254 | 508 | Blue | 9 | 6 | — | — | — | — |
| 27 | 254 | 635 | Blue | 9 | 6 | — | — | — | — |
| 28 | 254 | 762 | Blue | 9 | 5 | — | — | — | — |
| C-29 | 1016 | 1143 | Wine | 0 | 0 | — | — | — | — |
| 30 | 1016 | 1270 | Wine | 2 | 2 | — | — | — | — |
| 31 | 1016 | 1397 | Wine | 2 | 2 | — | — | — | — |
| 32 | 1016 | 1524 | Wine | 1 | 0 | — | — | — | — |

Examples 33–51

Composites of PREP. EX. 3, 4 and 7 were independently debossed using the boss configurations depicted in FIGS. 9, 10, and 11. For EXAMPLES 33–36, the "E" value in FIG. 9 was 635 μm and the "F" value was 254 μm. For EXAMPLES 37–41, the "E" value in FIG. 9 was 508 μm and the "F" value was 254 μm. The height of the raised portion of the die illustrated in FIG. 9 was 152 μm. For EXAMPLES 42–45, the "G" value in FIG. 10 was 889 μm, the "H" value was 1,245 μm, the "I" value was 508 μm, the "J" value was 508 μm, the "K" value was 381 μm, the "L" value was 254 μm and the "R" value was 229 μm. The height of the raised portion of the die illustrated in FIG. 10 was 152 μm. For EXAMPLES 46–51, the "M" value was 813 μm, the "N", "O" and "P" values each were 406 μm and the "Q" value was 254 μm. The height of the raised portions of the die illustrated in FIG. 11 was 152 μm.

Color changeable devices were produced by a debossing process using dies and counter dies having various boss configurations. The debossing process used the press setup described in EXAMPLES 1–16.

All the composites in TABLE IV were debossed with the liner side 24 of the composite adjacent the counter die ("LD"). Each resultant device was rated as described in EXAMPLES 1–16 and the rating set out in TABLE IV.

For EXAMPLES 43–44, the pressure used in the press setup was increased by turning the fine adjustment knob approximately 1–2 turns clockwise. The debossing process was repeated at the increased pressure and the quality of the debossed color changeable device rated as shown in TABLE IV.

The pressure used in the press setup was decreased for EXAMPLES 43–44 and 47 by turning the fine adjustment knob approximately 1–2 turns counterclockwise from the initial pressure setting. The debossing process was repeated at the decreased pressure and the quality of the debossed color changeable device rated as shown in TABLE IV.

TABLE IV

| Ex. No. | Composite of PREP. EX. No. | Boss Shape | Die of Figure | Color | Initial Pressure | Increased Pressure | Decreased Pressure |
|---|---|---|---|---|---|---|---|
| 33 | 7 | Hexagons-Wide | 9 | Blue | 8 | — | — |
| 34 | 7 | | | Wine | 8 | — | — |
| 35 | 7 | | | Green | 7 | — | — |
| 36 | 7 | | | Gold | 5 | — | — |
| 37 | 7 | Hexagons-Narrow | 9 | Blue | 7 | — | — |
| 38 | 7 | | | Wine | 7 | — | — |
| 39 | 7 | | | Green | 5 | — | — |
| 40 | 7 | | | Gold | 4 | — | — |
| 41 | 4 | | | Purple | 8 | — | — |
| 42 | 7 | Octagons with Squares | 10 | Blue | 7 | — | — |
| 43 | 7 | | | Wine | 6 | 7 | 5 |
| 44 | 7 | | | Green | 6 | 6 | 2 |
| 45 | 7 | | | Gold | 3 | — | — |
| 46 | 7 | Dots | 11 | Blue | 6 | — | — |
| 47 | 7 | | | Wine | 8 | — | 1 |
| 48 | 7 | | | Green | 6 | — | — |
| 49 | 7 | | | Gold | 5 | — | — |
| 50 | 3 | | | Wine | 7 | — | — |
| 51 | 4 | | | Purple | 6 | — | — |

The color changeable device of EXAMPLE 34 visibly exhibited a latent indicia in the debossed regions only. The paper liner was removed from the device and the device was applied to a glass surface. The device was then peeled off of the glass thereby separating the first and second layers of the interference color generating laminate. The device activated with the latent indicia 34 being visible in both the debossed and the non-debossed regions.

Examples 52–55

The composite of PREP. EX. 3 was embossed using dies and counter dies having the dot pattern described in EXAMPLES 1–16. TABLE V sets out the dot diameter ("Dot Diameter") and the distance from the center of one large dot to the center of the next large dot ("C/C Distance"). The embossing process used the press setup described in EXAMPLES 1–16. The interference color of the composite of all the examples was wine.

Composites were independently embossed with the liner side of the composite adjacent the counter die (i.e., liner side down; "LD") and the liner side adjacent the die (i.e., liner side up; "LU"). Each resultant device was rated as described in EXAMPLES 1–16 and the rating set out in TABLE V.

TABLE V

| Ex. | Dot Diameter | C/C | Embossed | |
|---|---|---|---|---|
| No. | (μm) | Distance (μm) | LD | LU |
| 52 | 1016 | 1143 | 3 | 1 |
| 53 | 1016 | 1270 | 2 | 1 |
| 54 | 1016 | 1397 | 1 | 0 |
| 55 | 1016 | 1524 | 1 | 0 |

Examples 56–59

The composite of PREP. EX. 3 was debossed using dies and counter dies having the dot pattern described in EXAMPLES 1–16. The debossing process used the press setup described in EXAMPLES 1–16. The interference color of the composite of all the examples was wine.

Composites were independently debossed with the liner side of the composite adjacent the counter die ("LD") and the liner side adjacent the die ("LU"). Each resultant device was rated as described in EXAMPLES 1–16 and the rating set out in TABLE VI.

TABLE VI

| Ex.No. | Dot Diameter (μm) | C/C Distance (μm) | Debossed LD | Debossed LU |
|---|---|---|---|---|
| C-56 | 254 | 381 | 0 | 0 |
| 57 | 254 | 508 | 10 | 6 |
| 58 | 254 | 635 | 7 | 5 |
| 59 | 254 | 762 | — | 1 |

Examples 60–64

The composite of PREP. EX. 4 was debossed using dies and counter dies having the dot pattern described in EXAMPLES 1–16. The debossing process used the press setup described in EXAMPLES 1–16. The interference color of the composite is set out in TABLE VII.

Composites were independently debossed with the liner side of the composite adjacent the counter die ("LD") and the liner side adjacent the die ("LU"). Each resultant device was rated as described in EXAMPLES 1–16 and the rating set out in TABLE VII.

TABLE VII

| Ex. No | Dot Diameter (μm) | C/C Distance (μm) | Interference Color | Debossed LD | Debossed LU |
|---|---|---|---|---|---|
| 60 | 254 | 762 | Wine | 4 | — |
| 61 | 635 | 762 | Purple | 2 | 1 |
| 62 | 635 | 889 | Purple | 2 | 2 |
| 63 | 635 | 1016 | Purple | 1 | 3 |
| 64 | 635 | 1143 | Purple | 1 | 2 |

Examples 65–68

The composite of PREP. EX. 8 was debossed using dies and counter dies having the dot pattern described in EXAMPLES 1–16. The debossing process used the press setup described in EXAMPLES 1–16. The interference color of the composite of all the examples was wine.

Composites were independently debossed with the liner side of the composite adjacent the counter die ("LD") and the liner side adjacent the die ("LU"). Each resultant device was rated as described in EXAMPLES 1–16 and the rating set out in TABLE VIII.

TABLE VIII

| Ex. No. | Dot Diameter (μm) | C/C Distance (μm) | Debossed LD | Debossed LU |
|---|---|---|---|---|
| C-65 | 254 | 381 | 0 | 0 |
| 66 | 254 | 508 | 4 | 0 |
| 67 | 254 | 635 | 4 | 1 |
| 68 | 254 | 762 | 3 | 0 |

Examples 69–73

The composite of PREP. EX. 7 was embossed using the die depicted in FIG. 12 with the boss configuration in the shape of lines of various widths (T value) and having various space (S value) between the lines. The height of the raised portion of the die depicted in FIG. 12 was 152 μm. TABLE IX sets out the line width, height and the space between the lines. The embossing process used the press setup described in EXAMPLES 1–16. The interference color of the composite was purple.

Color changeable devices were produced by an embossing process using dies and counter dies having various line widths and spacing between the lines. The composite of each example was embossed with the liner side of the composite adjacent the counter die (i.e., liner side down; "LD"). Each resultant device was rated as described in EXAMPLES 1–16 and the rating set out in TABLE IX.

TABLE IX

| Ex. No | Line Spacing (S) (μm) | Line Width (T) (μm) | Emboss Die Etch Depth (μm) 381 | 508 | 635 | 762 |
|---|---|---|---|---|---|---|
| 69 | 1524 | 1854 | 1 | 3 | 4 | 5 |
| 70 | 1905 | 1499 | 4 | 3 | 4 | 10 |
| 71 | 2286 | 1143 | 4 | 1 | 1 | 9 |
| C-72 | 2667 | 711 | 0 | 0 | 0 | 0 |
| C-73 | 3048 | 381 | 0 | 0 | 0 | 0 |

Comparative Examples A–D

Two label stocks available from 3M as ScotchMark™ Brand 7381 and ScotchMark™ Brand 7384 Tamper-Indicating Label Stocks were independently debossed using the dies and counter dies depicted in FIGS. 9, 10, and 11 with all the boss dimensions being those described in EXAMPLES 33–51. The embossing process used the press setup described in EXAMPLES 1–16.

Both label stocks contain a hidden message ("VOID") that becomes permanently visible when the label is removed from an article. These labels are constructed generally as follows. The top of the label is a polyester film, having a patterned release coating in the form of the word "VOID" on the bottom side of the film. The bottom of the film and release coating is covered with a primer layer. Adjacent the primer layer is either a layer of white ink (7381) or a layer of frangible metal (7384). This layer is covered with a layer of pressure sensitive adhesive and a release liner, which is removed to attach the label to an article.

The data in TABLE X show that neither label stock was activated using the debossing process of the invention.

TABLE X

| Comp. Ex. No. | Boss Configuration | Die of Figure | Label Stock 7381 | Label Stock 7384 |
|---|---|---|---|---|
| A | Hexagons–Wide | 9 | NE* | NE |
| B | Hexagons–Narrow | 9 | NE | NE |
| C | Octagons with Squares | 10 | NE | NE |
| D | Dots | 11 | NE | NE |

*NE = No Effect, i.e., the "VOID" message was not activated and hence was not visible.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. It should be understood that the relative thickness of the various layers shown in the figures are not to scale. No unnecessary limitations are to be understood therefrom. It will be apparent to those skilled in the art that many changes can be made in the embodiments described without departing from the scope of the invention. For example, color changeable devices may be adjacent to one another or may be stacked one on top of another. Color changeable devices may be adhered to an article by hot melt adhesives or other adhesives. Also, adjacent color changeable devices may have perforations between them. Thus, the scope of the present invention should not be limited to the exact details and structures described herein, but rather by the structures described by the language of the claims, and the equivalents of those structures.

What is claimed is:

1. A color changeable device comprising:

a) a flexible substrate comprising a first major surface and a second major surface;

b) an interference color generating laminate on said first major surface comprising a first layer and a second layer in intimate contact;

i) wherein when said first and second layers are in intimate contact, said laminate generates an interference color;

ii) wherein when said first and second layers are not in intimate contact, said laminate does not generate said interference color; and iii) wherein said first layer comprises a material selected from the group consisting of tantalum, niobium, zirconium, hafnium, titanium, tungsten, vanadium, molybdenum, nickel, iron, chromium, bismuth and silicon, and wherein said second layer comprises an oxide of said first layer;

c) wherein said substrate and laminate include a first permanent deformation causing separation of said first and second layers so as not to be in intimate contact at a first portion of said device while retaining said first and second layers in intimate contact at a second portion of said device; and d) wherein said substrate is continuous.

2. The device of claim 1, wherein bending said laminate to a sufficiently small radius separates said first and second layers so as not to be in intimate contact.

3. The device of claim 1, wherein said first and second layers include a preferential area with a high bond strength of intimate contact so as to not separate within said first portion.

4. The device of claim 3, wherein said area of high bond strength is in the form of an indicia.

5. The device of claim 4, wherein said indicia is in the form of a registered U.S. trademark.

6. The device of claim 4, wherein said indicia is in the form of copyrighted material.

7. The device of claim 4, wherein said indicia is a symbol.

8. The device of claim 4, wherein said indicia is alphanumeric characters.

9. The device of claim 3, wherein said area of high bond strength is in the form of a positive image of indicia.

10. The device of claim 3, wherein said area of high bond strength is in the form of a negative image of indicia.

11. The device of claim 1, further comprising a layer of adhesive on said second major surface of said flexible substrate.

12. The device of claim 11, further comprising a release liner provided on an exposed surface of said layer of adhesive.

13. The device of claim 1, further comprising a translucent layer provided on an exposed surface of said color generating laminate.

14. The device of claim 13, wherein removing said translucent layer separates said first and second layers of said laminate.

15. The device of claim 13, wherein said translucent layer is a polymeric film.

16. The device of claim 13, wherein said translucent layer includes said permanent deformation.

17. The device of claim 1, wherein said permanent deformation is a boss.

18. The device of claim 17, wherein said boss projects from said first surface of said substrate.

19. The device of claim 17, wherein said boss projects from said second surface of said substrate.

20. The device of claim 1, wherein said first layer comprises tantalum and wherein said second layer comprises tantalum oxide.

21. The device of claim 1, wherein said first layer comprises niobium and wherein said second layer comprises niobium oxide.

22. The device of claim 1 in combination with an article to be authenticated.

23. The device of claim 1, wherein said substrate and laminate further include a second deformation, remote from said first deformation, causing separation of said first and second layers at a first portion of said device extending from said first deformation to said second deformation.

24. A color changeable device comprising:

a) a flexible substrate comprising a first major surface and a second major surface;

b) an interference color generating laminate on said first major surface comprising a first layer and a second layer in intimate contact;

i) wherein when said first and second layers are in intimate contact, said laminate generates an interference color;

ii) wherein when said first and second layers are not in intimate contact, said laminate does not generate said interference color; and iii) wherein said first layer comprises a material selected from the group consisting of tantalum, niobium, zirconium, hafnium, titanium, tungsten, vanadium, molybdenum, nickel, iron, chromium, bismuth and silicon, and wherein said second layer comprises an oxide of said first layer;

c) wherein said substrate and laminate include a first permanent deformation causing separation of said first and second layers of said laminate so as not to be in intimate contact at a first portion of said device while retaining said first and second layers in intimate contact at a second portion of said device; and d) wherein the structural integrity of said substrate is maintained at said permanent deformation.

25. The device of claim 24, wherein bending said laminate to a sufficiently small radius separates said first and second layers so as not to be in intimate contact.

26. The device of claim 24, wherein said first and second layers include a preferential area with a high bond strength of intimate contact so as to not separate within said first portion.

27. The device of claim 24, further comprising a layer of adhesive on said second major surface of said flexible substrate.

28. The device of claim 24, further comprising a translucent layer provided on an exposed surface of said color generating laminate.

29. The device of claim 28, wherein removing said translucent layer separates said first and second layers of said laminate.

30. The device of claim 24, wherein said first layer comprises tantalum and wherein said second layer comprises tantalum oxide.

31. The device of claim 24 in combination with an article to be authenticated.

32. The device of claim 24, wherein said substrate and laminate further includes a second deformation, remote from said first deformation, causing separation of said first and second layers at a first portion of said device extending from said first deformation to said second deformation.

33. A color changeable device comprising:

a) a flexible substrate comprising a first major surface and a second major surface;

b) an interference color generating laminate on said first major surface comprising a first layer and a second layer in intimate contact;

i) wherein when said first and second layers are in intimate contact, said laminate generates an interference color;

ii) wherein when said first and second layers are not in intimate contact, said laminate does not generate said interference color; and iii) wherein said first layer comprises a material selected from the group consisting of tantalum, niobium, zirconium, hafnium, titanium tungsten, vanadium, molybdenum, nickel, iron, chromium, bismuth and silicon, and wherein said second layer comprises an oxide of said first layer;

c) a layer of adhesive on said second major surface of said flexible substrate;

d) a release liner provided on an exposed surface of said layer of adhesive;

e) a translucent layer provided on an exposed surface of said color generating laminate;

f) wherein said substrate, said laminate, said layer of adhesive, said release liner, and said translucent layer include a first permanent deformation causing separation of said first and second layers so as not to be in intimate contact at a first portion of said device while retaining said first and second layers in intimate contact at a second portion of said device.

34. The device of claim 33, wherein said first and second layers include a preferential area with a high bond strength of intimate contact so as to not separate within said first portion.

35. The device of claim 33, wherein said first layer comprises tantalum and wherein said second layer comprises tantalum oxide.

36. The device of claim 33 in combination with an article to be authenticated.

37. The device of claim 33, wherein said substrate and laminate further includes a second deformation, remote from said first deformation, causing separation of said first and second layers at a first portion of said device extending from said first deformation to said second deformation.

38. A color changeable device comprising:

a) a flexible substrate comprising a first major surface and a second major surface;

b) an interference color generating laminate on said first major surface comprising a first layer and a second layer in intimate contact;

i) wherein when said first and second layers are in intimate contact, said laminate generates an interference color;

ii) wherein when said first and second layers are not in intimate contact, said laminate does not generate said interference color; and iii) wherein said first layer comprises a material selected from the group consisting of tantalum, niobium, zirconium, hafnium, titanium, tungsten, vanadium, molybdenum, nickel, iron, chromium, bismuth and silicon, and wherein said second layer comprises an oxide of said first layer;

c) wherein said substrate and laminate include a first permanent deformation causing separation of said first and second layers of said laminate so as not to be in intimate contact at a first portion of said device while retaining said first and second layers in intimate contact at a second portion of said device;

d) wherein said first and second layers include a preferential area with a sufficiently high bond strength so as to remain in intimate contact;

e) wherein said areas of high bond strength are in the form of indicia; and f) wherein said first portion of said device includes said preferential areas of high bond strength.

39. The device of claim 38, wherein said areas of high bond are in the form of a positive image of indicia.

40. The device of claim 38, wherein said areas of high bond are in the form of a negative image of indicia.

41. The device of claim 38, further comprising a layer of adhesive on said second major surface of said flexible substrate.

42. The device of claim 38, further comprising a translucent layer provided on an exposed surface of said color generating laminate.

43. The device of claim 38, wherein said first layer comprises tantalum and wherein said second layer comprises tantalum oxide.

44. The device of claim 38 in combination with an article to be authenticated.

45. The device of claim 38, wherein said substrate and laminate further includes a second deformation, remote from said first deformation, causing separation of said first and second layers at a first portion of said device extending from said first deformation to said second deformation.

46. A color changeable device comprising:

a) a flexible substrate comprising a first major surface and a second major surface;

b) an interference color generating laminate on said first major surface comprising:

i) a first layer and a second layer in intimate contact, wherein when said first and second layers are in intimate contact, said laminate generates an interference color and wherein when said first and second layers are not in intimate contact, said laminate does not generate said interference color;

ii) wherein said first layer comprises a material selected from the group consisting of tantalum, niobium, zirconium, hafnium, titanium, tungsten, vanadium, molybdenum, nickel, iron, chromium, bismuth and silicon, and wherein said second layer comprises an oxide of said first layer;

c) wherein said device is bossed so as to cause separation of said first and second layers so as not to be in intimate contact at a first portion of said device while retaining said first and second layers in intimate contact at a second portion of said device.

47. The device of claim 46, wherein said first and second layers include a preferential area with a high bond strength of intimate contact so as to not separate within said first portion.

48. The device of claim 47, wherein said areas of high bond strength are in the form of a positive image of indicia.

49. The device of claim 47, further comprising a layer of adhesive on said second major surface of said flexible substrate.

50. The device of claim 47, further comprising a translucent layer provided on an exposed surface of said color generating laminate.

51. The device of claim 50, wherein said translucent layer is a polymeric film.

52. The device of claim 50, wherein said translucent layer is bossed.

53. The device of claim 46, wherein said first layer comprises tantalum and wherein said second layer comprises tantalum oxide.

54. The device of claim 46 in combination with an article to be authenticated.

55. The device of claim 46, wherein said substrate and laminate include a first boss and a second boss, remote from said first boss, causing separation of said first and second layers at a first portion of said device extending from said first boss to said second boss.

56. A color changeable device comprising:

a) a flexible substrate comprising a first major surface and a second major surface;

b) an interference color generating laminate on said first major surface comprising a first layer and a second layer in intimate contact;

i) wherein when said first and second layers are in intimate contact, said laminate generates an interference color;

ii) wherein when said first and second layers are not in intimate contact, said laminate does not generate said interference color; and iii) wherein said first layer comprises a material selected from the group consisting of tantalum, niobium, zirconium, hafnium, titanium, tungsten, vanadium, molybdenum, nickel, iron, chromium, bismuth and silicon, and wherein said second layer comprises an oxide of said first layer;

c) wherein said substrate and laminate include a first deformation and a second deformation, remote from said first deformation, causing separation of said first and second layers of said laminate so as not to be in intimate contact at a first portion of said device extending from said first deformation to said second deformation while retaining said first and second layers in intimate contact at a second portion of said device.

57. The device of claim 56, wherein said first and second layers include a preferential area with a high bond strength of intimate contact so as to not separate within said first portion.

58. The device of claim 56, further comprising a translucent layer provided on an exposed surface of said color generating laminate.

59. The device of claim 58, wherein said translucent layer is a polymeric film.

60. The device of claim 56, wherein said translucent layer includes said first and second permanent deformations.

61. The device of claim 56, wherein said first layer comprises tantalum and wherein said second layer comprises tantalum oxide.

62. The device of claim 56 in combination with an article to be authenticated.

63. A method of activating a local portion of a color changeable device comprising the steps of:

a) placing a color changeable device between a die and counter die having corresponding recessed and raised portions, wherein the device comprises:

i) a flexible substrate comprising a first major surface and a second major surface;

ii) an interference color generating laminate on the first major surface comprising a first layer and a second layer in intimate contact:

a) wherein when the first and second layers are in intimate contact the laminate generates an interference color;

b) wherein when the first and second layers are not in intimate contact, the laminate does not generate the interference color; and c) wherein said first layer comprises a material selected from the group consisting of tantalum, niobium, zirconium hafnium, titanium, tungsten, vanadium, molybdenum, nickel, iron, chromium, bismuth and silicon, and wherein said second layer comprises an oxide of said first layer;

b) compressing the die and counter die with sufficient pressure so as to permanently deform the device to cause separation of the first and second layers so as not to be in intimate contact at a first portion of the device while retaining the first and second layers in intimate contact at a second portion of the device.

64. The method of claim 63, wherein step a) includes orienting the device such that the first major surface faces the die and the second major surface faces the counter die.

65. The method of claim 63, wherein step a) includes orienting the device such that the second major surface faces the die and the first major surface faces the counter die.

* * * * *